United States Patent [19]   [11]   4,177,680
Coleman   [45]   Dec. 11, 1979

[54] DUAL PRESSURE SENSOR
[75] Inventor: Dennis C. Coleman, Delavan, Wis.
[73] Assignee: Bunker Ramo Corporation, Oak Brook, Ill.
[21] Appl. No.: 842,189
[22] Filed: Oct. 14, 1977
[51] Int. Cl.² .............................................. G01L 9/12
[52] U.S. Cl. ....................................... 73/718; 73/724; 361/283
[58] Field of Search .................... 73/718, 724; 361/283
[56] References Cited
U.S. PATENT DOCUMENTS

| 3,808,480 | 4/1974 | Johnston | 73/718 |
|---|---|---|---|
| 3,965,746 | 6/1976 | Rabek | 73/718 |
| 4,040,118 | 8/1977 | Johnston | 73/718 |

Primary Examiner—Donald O. Woodiel
Attorney, Agent, or Firm—F. M. Arbuckle; J. Hoffman

[57] ABSTRACT

A variable capacitance dual pressure sensor for sensing the pressure levels of a pair of fluids independently comprises an enclosure having a top wall and a bottom wall, and a substrate of dielectric material having a first major surface facing the top wall and a second major surface facing the bottom wall. A first electrode is affixed to a portion of the first major surface and a second electrode is affixed to a portion of the second major surface. A first flexible electrically conductive diaphragm is sealed to the first major surface of the substrate and is spaced from the first electrode to form therewith the plates of a first capacitor and a second flexible electrically conductive diaphragm is sealed to the second major surface of the substrate and is spaced from the second electrode to form therewith the plates of a second capacitor. The first and second diaphragms are electrically coupled together to form a common connection. The substrate is sealably mounted within the enclosure forming therewith a first chamber external to the first diaphragm for receiving a first fluid and a second chamber external to the second diaphragm for receiving a second fluid.

18 Claims, 2 Drawing Figures

DUAL PRESSURE SENSOR

BACKGROUND OF THE INVENTION

The present invention is generally directed to a fluid pressure sensing unit and more particularly to a variable capacitance dual pressure sensing unit which senses independently the pressure levels of a pair of fluids.

It is often desirable to sense the pressure level of a fluid by developing an electrical signal having a magnitude related to the fluid pressure. One method of accomplishing this end is to provide a sensing unit which comprises a variable capacitor wherein the capacitance of the sensing unit varies as a function of applied pressure. Suitable circuitry, such as that disclosed in copending patent application Ser. No. 793,614, filed on May 4, 1977, in the names of Allen A. Bukosky and Paul P. Monroe and which is assigned to the assignee of the present invention, transform the variable capacitance to an output voltage which has a magnitude related to the applied pressure. The capacitance-to-voltage transformation circuit disclosed and claimed in the aforementioned copending application acts upon the variable capacitance to provide an output voltage which has a magnitude linearly related to the applied pressure. As a result, the applied pressure can be easily determined.

Sensing units of the kind referred to above are well-known in the art. For example, reference may be made to U.S. Pat. No. 3,808,480 which issued on Apr. 30, 1974 and U.S. Pat. No. 3,880,009 which issued on Apr. 29, 1975 to the assignee of the present invention for descriptions of the basic sensing unit structure and operation. In the latter of these patents it is explained that the basic sensing unit takes the form of a capacitor unit which includes an electrode deposited onto a ceramic substrate forming one capacitor plate which is fixed and a flexible diaphragm sealed to the substrate in juxtaposition to the fixed plate forming the other capacitor plate which is deflectable. With the side of the diaphragm opposite the fixed plate exposed to a fluid pressure, the diaphragm will deflect toward or away from the fixed plate responsive to the applied pressure with consequent changes in capacitance between the plates.

Pat. No. 3,808,480 describes a sensing unit which includes a pair of fixed electrodes and a pair of diaphragms arranged in the above referred to relation on opposite sides of the substrate. The two fixed plates are electrically coupled together forming a second connection. The capacitance related to the pressure applied to both diaphragms is taken across the first and second connections.

Sensing units of the type just referred to have been found to be very reliable for sensing a single fluid pressure. Where it is desired to sense the pressure levels of a pair of fluids independently or the differential between the pressure levels of two fluids, it has been necessary to employ two of these sensing units. Differential fluid pressure sensing in this manner is contemplated for example in copending application Ser. No. 776,524, filed on Mar. 11, 1977, and which is assigned to the assignee of the instant invention.

While differential fluid pressure sensing using two sensor units has been found to be acceptable, it exhibits economic shortcomings by virtue of the fact that two sensor units are required. Also, its use is limited to those applications affording sufficient space to accept two sensor units. Lastly, because no two sensor units can ever be exactly alike due to variations in assembly conditions even within tight manufacturing tolerances, there will always be at least some tracking error between the two units.

It is therefore a general object of the present invention to provide a fluid pressure sensing unit which is capable of independently detecting the pressure levels of a pair of fluids.

It is another object of the present invention to provide a dual pressure sensing unit which may be utilized for determining the absolute pressures of two fluids or the pressure differential between a pair of fluids.

It is a further object of the present invention to provide a dual pressure sensing unit which minimizes pressure tracking errors during the pressure sensing of two fluids.

It is a still further object of the present invention to provide a dual pressure sensing unit which comprises fewer component parts than heretofore possible by the prior art for independently sensing the pressure levels of two fluids with consequent economy.

SUMMARY OF THE INVENTION

The invention provides a variable capacitance dual pressure sensing unit which comprises an enclosure, a substrated dielectric material within said enclosure having a first major surface and a second major surface, a first electrode affixed to a portion of the first major surface, and a second electrode affixed to a portion of the second major surface and electrically isolated from the first electrode. The dual pressure sensor additionally comprises a first flexible electrode mounted in sealed relation to the first major surface of the substrate and spaced from the first electrode forming therewith the plates of a first capacitor, a second flexible electrode mounted in sealed relation to the second major surface of the substrate and spaced from the second electrode forming therewith the plates of a second capacitor wherein the first and second flexible electrodes are electrically coupled together forming a common connection, and the substrate being sealably mounted within the enclosure forming therewith a first chamber external to the first flexible electrode and a second chamber external to the second flexible electrode.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, and in the several figures of which like reference numerals identify like elements, and in which:

DESCRIPTION OF THE PREFERRED EMBODIMENT

Figure 1:
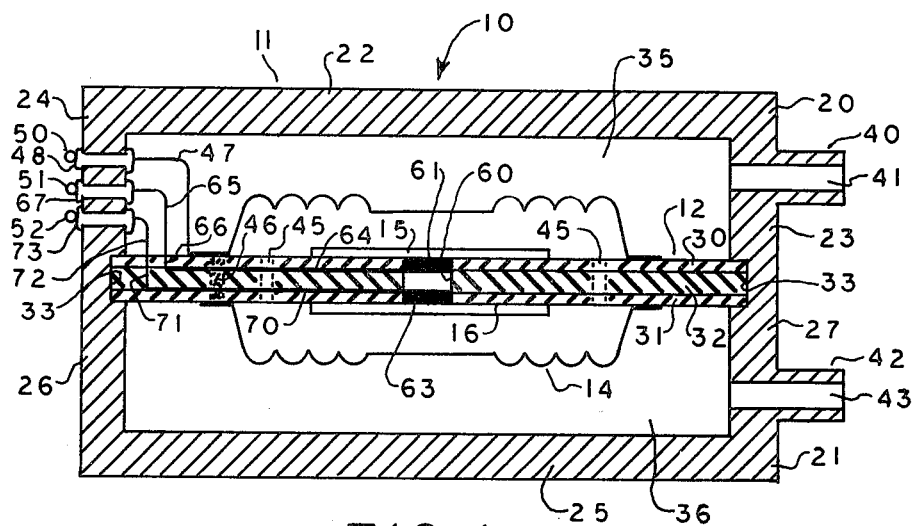
FIG. 1 is a cross-sectional view of a dual pressure sensor embodying the present invention.

Referring now to FIG. 1, the dual pressure sensor 10 there shown which embodies the present invention generally includes an enclosure 11, a substrate of dielectric material, first and second flexible electrodes formed from thin conductive diaphragms 13 and 14 respectively, and first and second electrodes 15 and 16.

The enclosure 11 comprises an upper half 20 and a bottom half 21. Top half 20 has a top wall 22 and integral depending sidewalls 23 and 24. In a similar manner, the enclosure bottom half includes a bottom wall 25 and upstanding integral sidewalls 26 and 27. The enclosure halves are arranged to mate together and to be sealed when assembled with an appropriate sealant to preclude leakage between the junction of the two halves.

The substrate 12 comprises three laminations 30, 31 and 32 which are formed from a dielectric material such as a high alumina ceramic. When the upper half 20 and bottom half 21 of the enclosure are joined together, they form a peripheral slot 33 in which the substrate 12 seats and is sealed therein. As a result, a first chamber 35 is formed and a second chamber 36 is formed.

The upper half 20 of enclosure 11 also includes a port 40 having a central bore 41 which extends through sidewall 23 so that a first fluid whose pressure is to be monitored may be given access to the interior of the first chamber 35. Similarly, bottom half 21 includes a port 42 which also has a central bore 43 extending through sidewall 27 so that a second fluid whose pressure is to be monitored may be introduced into the second chamber 36.

The exposed surface of lamination 30 of substrate 12 comprises a first major surface of the substrate and it faces towards the top wall 22 of the enclosure. Deposited onto the substrate first major surface by screen process printing is electrode 15 which comprises a first electrode or land area. A suitable composition for electrode 15 for this purpose is DuPont Paladiam/Silver Conductor Composition 9061, which after a few minutes drying can be fired at a peak temperature of 850° C. to give a conductor which adheres firmly to the substrate, and is readily solderable.

In a similar manner, the exposed surface of lamination 31 of substrate 12 comprises a second major surface of the substrate which faces towards the bottom wall 25 of the enclosure. Deposited onto the second major surface is second electrode 16 which is affixed to the substrate in the previously described manner. For purposes of this preferred embodiment, the electrodes 15 and 16 are shown affixed to the substrate in the central area of the substrate.

The diaphragm 13 is formed from thin flexible electrically conductive material and is sealed to the substrate first major surface. A suitable material for the diaphragm is NI-Span-C Alloy 902 produced by Inglehard Industries, a Division of Inglehard Minerals and Chemicals Corporation. This material has a temperature coefficient of expansion very similar to that of the ceramic substrate material so that the bond between the diaphragm and the substrate is subject to a minimum of stress in response to temperature changes. By appropriate heat treatment, it can be caused to have a very low thermo-elastic coefficient of modulus of elasticity and the thermo-coefficient of expansion. A low value of TEC is desirable to assure a reasonably constant calibration characteristic for the device, throughout a range of working temperatures.

The diaphragm 14 is essentially identical to the diaphragm 13 and is adhered to the substrate in the same manner as described above. With diaphragm 13 sealed to the first major surface of the substrate in juxtaposition to the electrode 15, the diaphragm 13 and electrode 15 form the plates of a first capacitor. Similarly, diaphragm 14 and electrode 16 form the plates of a second capacitor.

The substrate 12 includes a plurality of vent bores 45 extending through the laminations 30, 31 and 32 so that the pressure within the diaphragms 13 and 14 may be equalized. Additionally, the interior of the diaphragms is preferably partially evacuated in the manner described in the aforementioned U.S. Pat. No. 3,808,480. In that patent, it is taught that the interior of the diaphragms may be evacuated by providing one of the diaphragms with a small hole and placing the unit in a vacuum chamber, exhausting the chamber to the desired vacuum leve, and while the vacuum is still maintained, closing off the hole by solder.

The diaphragms 13 and 14 are electrically coupled together to provide a common connection and to shield the electrodes 15 and 16 from stray capacitance. To this end, the substrate 12 includes a bore 46 in the vicinity of the periphery of the diaphragms 13 and 14 which is filled with an electrically conductive deposit which couples the diaphragms together. The common connection of the diaphragms is coupled to an external feedthrough terminal 50 of feedthrough 48 by a lead 47.

The electrodes 15 and 16 are isolated from one another and are also coupled to external feedthrough terminals 51 and 52. The laminations 30, 31 and 32 of substrate 12 include a central bore 60 which has an upper peripheral coating 61 of conductive material and a lower peripheral coating 63 of conductive material. The coatings 61 and 63 are spaced apart by approximately the thickness of lamination 32. A conductive deposit 64 between laminations 30 and 32 extends from the central bore 60 beyond the periphery of the diaphragms and is connected to a lead 65 through another conductive deposit 66 in the substrate. The lead 65 is coupled to the feedthrough 67 which includes the external terminal 51. In a similar manner, the electrode 16 is coupled to its external feedthrough terminal 52 through the lower peripheral coating 63, conductive deposit 70 between laminations 31 and 32, conductive deposit 71 which extends upwardly to the first major surface of substrate 12 and through lead 72 coupled to feedthrough 73 which includes the external terminal 52.

Figure 2:
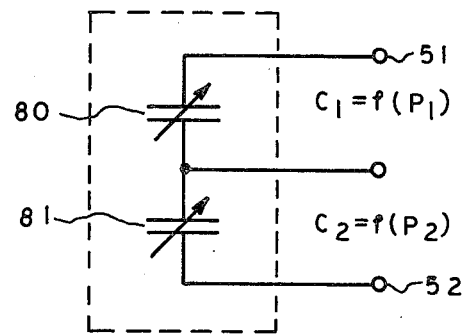
FIG. 2 is a schematic circuit diagram showing the equivalent circuit of the dual pressure sensor of FIG. 1.

Referring now to FIG. 2, the diaphragm 13 and electrode 15 form the plates of a first variable capacitor 80 and diaphragm 14 and electrode 16 form the plates of a second variable capacitor 81. The variable capacitors 80 and 81 are connected in common to terminal 50 corresponding to the coupling together of the diaphragms 13 and 14. The side of variable capacitor 80 opposite the common connection is shown connected to the external terminal 51. In a similar manner, the side of variable capacitor 81 opposite the common connection is coupled to external terminal 52.

In operation, the sensing unit of FIG. 1 is capable of independently sensing the pressure of two fluids wherein a first fluid is introduced into chamber 35 external to diaphragm 13 through port 40 and a second fluid is introduced into chamber 36 external to diaphragm 14 through port 42. The capacitance seen across external terminals 50 and 51 represents the pressure of the first fluid within chamber 35. Similarly, the capacitance seen across external terminals 50 and 52 represents the pressure of the second fluid within chamber 36.

As the first fluid is introduced into chamber 35 through port 40, the diaphragm 13 will deflect either towards or away from electrode 15 depending upon the pressure of the first fluid to thereby result in a capacitance across terminals 50 and 51 which is related to the pressure within the chamber 35. Because chamber 35 is sealed with respect to chamber 36, the capacitance across the external terminals 50 and 51 will represent only the pressure within chamber 35.

Likewise, when the second fluid is introduced into the second chamber 36 through port 42, the diaphragm 14 will be deflected either towards or away from electrode 16 so that the capacitance across external terminals 50 and 52 will represent the pressure within the second chamber 36. As previously explained, because chamber 36 is sealed with respect to chamber 35, the capacitance across external terminals 50 and 52 will represent only the pressure within the second chamber 36.

The sensing unit of the present invention finds many possible applications. In those applications where it is desired to monitor both atmospheric pressure and the absolute pressure of a fluid, port 40 may be left exposed to the atmosphere so that the capacitance of the first variable capacitor 80 will represent the atmospheric pressure. With a fluid in chamber 36, the capacitance of the variable capacitor 81 formed by the diaphragm 14 and electrode 16 will represent the absolute pressure of the fluid within the second chamber 36.

It can also be appreciated that the sensing unit of FIG. 1 can also be used for sensing differential pressure. The capacities of the variable capacitors 80 and 81 may be connected to commonly known circuitry which provides an output voltage which is a function of the difference in capacitance between the variable capacitors 80 and 81 and thus a function of the differential pressures existing within the two chambers 35 and 36.

From the foregoing, it can be seen that the present invention provides a dual pressure sensing unit which is capable of independently sensing the pressure levels of two fluids to provide a means by which the absolute pressures of the fluids may be independently determined or the difference in pressures may be determined. While accomplishing these ends, only one sensing unit is required which minimizes the number of component parts heretofore necessary and thus resulting in consequent economical advantages. Also, because only one sensing unit is required, the sensing unit of the present invention may be utilized in those applications where available space is limited and where such available space is inadequate to accommodate two separate sensing units.

The dual pressure sensor of the present invention not only exhibits substantial size and economical advantages but also provides improved performance over prior art structures for sensing differential pressure. Because the pair of variable capacitors use virtually identical diaphragms, utilize the same ceramic dielectric, and are assembled during the same process, their temperature tracking coefficient and hysteresis errors will be substantially the same, which when combined in a differential mode, will narly totally cancel. Also, because the substrate has a plurality of bores for equalizing the pressure within the two diaphragms, should there be a slight fluid leak into one of the diaphragms, both capacitors will be equally effected. Hence, in the differential mode, there will be a common mode rejection of these effects which will prolong the useful life of the dual pressure sensor. These advantages are not realized with prior art methods employing a pair of individual pressure sensors in a differential mode because each will have a different temperature tracking coefficient and hysteresis error as well as different leakage rates.

While a particular embodiment of the present invention has been shown and described, it will be obvious to those skilled in the art that various changes and modifications may be made without departing from the invention in its broader aspects. It is therefore the aim in the appended claims to cover all such changes and modifications as may fall within the true spirit and scope of the invention.

I claim:

1. A variable capacitance dual pressure sensor comprising:
   an enclosure;
   a substrate of dielectric material within said enclosure having a first major surface and a second major surface;
   a first electrode affixed to a portion of said first major surface;
   a second electrode affixed to a portion of said second major surface and electrically isolated from said first electrode;
   a first flexible electrode mounted in sealed relation to said first major surface of said substrate and spaced from said first electrode forming therewith the plates of a first capacitor, with said second fixed electrode being isolated from any capacitance variances caused by said first flexible electrode;
   a second flexible electrode mounted in sealed relation to said second major surface of said substrate and spaced from said second electrode forming therewith the plates of a second capacitor, said first and second flexible electrodes being movable independently of each other and electrically coupled together forming a common connection, and with said first fixed electrode being isolated from any capacitance variances caused by said second flexible electrode;
   said substrate being sealably mounted within said enclosure forming therewith a first chamber external to said first flexible electrode and a second chamber external to said second flexible electrode and sealed from said first chamber; and means to communicate a variable pressure to at least one of the Chambers.

2. A pressure sensor as defined in claim 1 wherein said first chamber includes a first port communicating with said first chamber for introducing a first fluid into said first chamber and a second port communicating with said second chamber for introducing a second fluid into said second chamber.

3. A pressure sensor as defined in claim 2 further comprising lead means for providing electrical connection to said common connection, said first electrode and said second electrode external to said enclosure.

4. A pressure sensor as defined in claim 3 wherein said substrate comprises a plurality of dielectric laminations and wherein said lead means comprise conductive paths communicating with said electrodes and extending between said laminations beyond the periphery of said flexible electrodes.

5. A pressure sensor as defined in claim 4 wherein said first and second flexible electrodes are coupled through said substrate.

6. A pressure sensor as defined in claim 5 wherein said substrate includes a bore extending between said flexible electrodes and a deposit of conductive material within said bore for electrically coupling said flexible electrodes together.

7. A variable capacitance dual pressure sensor comprising:
   an enclosure having a top wall and a bottom wall;

a substrate of dielectric material having a first major surface facing said top wall and a second major surface facing said bottom wall, a first electrode comprising a first electrically conductive film affixed to a portion of said first major surface;

a second electrode comprising a second electrically conductive film affixed to a portion of said second major surface and electrically isolated from said first electrode;

a first thin flexible electrically conductive diaphragm sealed to said first major surface of said substrate and spaced from said first electrode forming therewith the plates of a first capacitor, with said second fixed electrode being isolated from any capacitance variances caused by said first flexible diaphragm;

a second thin flexible electrically conductive diaphragm sealed to said second major surface of said substrate and spaced from said second electrode forming therewith the plates of a second capacitor, said first and second diaphragms being movable independently of each other and electrically coupled together forming a common connection, and with said first fixed electrode being isolated from any capacitance variances caused by said second flexible diaphragm;

said substrate being sealably mounted within said enclosure forming therewith a first chamber external to said first diaphragm and a second chamber external to said second diaphragm and sealed from said first chamber; and means to communicate a variable pressure to at least one of the Chambers.

8. A pressure sensor as defined in claim 7 wherein said first chamber includes a first port communicating with said first chamber for introducing a first fluid into said first chamber and a second port communicating with said second chamber for introducing a second fluid into said second chamber.

9. A pressure sensor as defined in claim 8 further comprising lead means for providing electrical connection to said common connection, said first electrode and said second electrode external to said enclosure.

10. A pressure sensor as defined in claim 9 wherein said substrate comprises a plurality of dielectric laminations and wherein said lead means comprise conductive paths communicating with said electrodes and extending between said laminations beyond the periphery of said diaphragms.

11. A pressure sensor as defined in claim 10 wherein said first and second diaphragms are coupled through said substrate.

12. A pressure sensor as defined in claim 11 wherein said substrate includes a bore extending between said diaphragms and a deposit of conductive material within said bore for electrically coupling said diaphragms together.

13. A pressure sensor as defined in claim 7 wherein said substrate includes at least one bore within the periphery of said diaphragms and extending between said major surfaces for equalizing the pressure within said diaphragms.

14. A pressure sensor as defined in claim 13 wherein the volume within said diaphragms is at least partially evacuated.

15. A variable capacitance dual pressure sensor for providing two separate variable capacitances responsive to two respective applied pressures comprising:

an enclosure having a top wall and a bottom wall;

a substrate of insulating material having a first major surface facing said top wall and a second major surface facing said bottom wall;

a first electrode affixed to a portion of said first major surface;

a second electrode affixed to a portion of said second major surface and electrically isolated from said first electrode;

a first flexible electrically conductive diaphragm sealed to said substrate first major surface and enclosing said first electrode, said first diaphragm being spaced from said first electrode to form therewith a first variable capacitor, with said second fixed electrode being isolated from any capacitance variances caused by said first flexible diaphragm;

a second flexible electrically conductive diaphragm movable independently of said first diaphragm sealed to said substrate second major surface and enclosing said second electrode, said second diaphragm being spaced from said second electrode to form therewith a second variable capacitor and coupled to said first diaphragm to provide a common connection, and with said first fixed electrode being isolated from any capacitance variances caused by said second flexible diaphragm;

said substrate being sealably mounted within said enclosure forming a first chamber external to said first diaphragm and a second chamber external to said second diaphragm;

a first port communicating with said first chamber for introducing a first fluid into said first chamber for causing the capacitance of said first capacitor to vary as a function of the pressure of said first fluid; and a second port communicating with said second chamber for introducing a second fluid into said second chamber for causing the capacitance of said second capacitor to vary as a function of the pressure of said second fluid independently of said first fluid pressure.

16. A pressure sensor as defined in claim 1 wherein the volume between said flexible electrodes and their respective fixed electrodes is at least partially evacuated.

17. A pressure sensor as defined in claim 1 wherein said substrate includes at least one bore within the periphery of said flexible electrodes and extending between said major surfaces for equalizing the pressure within said electrodes.

18. A pressure sensor as defined in claim 17 wherein the volume within said electrodes is at least partially evacuated.

* * * * *